US00RE49640E

(19) United States
(12) Reissued Patent
Feng

(10) Patent Number: US RE49,640 E
(45) Date of Reissued Patent: Sep. 5, 2023

(54) METHOD OF MANUFACTURING VELVET PLUSH AND ARTICLE THEREOF

(71) Applicant: Chen Feng, City of Industry, CA (US)

(72) Inventor: Chen Feng, City of Industry, CA (US)

(21) Appl. No.: 15/807,479

(22) Filed: Nov. 8, 2017

Related U.S. Patent Documents

Reissue of:
(64) Patent No.: 9,181,646
Issued: Nov. 10, 2015
Appl. No.: 13/507,616
Filed: Jul. 12, 2012

(51) Int. Cl.
*D06C 29/00* (2006.01)
*D06C 27/00* (2006.01)
*D03D 27/10* (2006.01)

(52) U.S. Cl.
CPC ..... *D06C 29/00* (2013.01); *D03D 27/10* (2013.01); *D06C 27/00* (2013.01)

(58) Field of Classification Search
None
See application file for complete search history.

(56) References Cited

U.S. PATENT DOCUMENTS 1,390,093 A * 9/1921 Cucumel ..... D06C 29/00 26/2 R
1,484,292 A * 2/1924 Boyd ..... 139/391
1,664,993 A * 4/1928 Osthoff ..... D06C 9/00 26/6
2,160,827 A * 6/1939 Cheney ..... D06M 15/423 26/69 R
2,229,970 A * 1/1941 Graham ..... D06C 29/00 26/2 R
2,238,098 A * 4/1941 Bradshaw ..... D03D 27/00 139/391

(Continued)

FOREIGN PATENT DOCUMENTS

CN 102505535 * 6/2012 ..... D06C 11/00
EP 1431437 A1 * 6/2004 ..... D06C 11/00

(Continued)

OTHER PUBLICATIONS

Hussain, Dr. Tanveer, Singeing Fundamentals, Jul. 2008, https://www.fibre2fashion.com/industry-article/3474/singeing-fundamentals, p. 1-13 (Year: 2008).*

(Continued)

*Primary Examiner* — Glenn K Dawson
(74) *Attorney, Agent, or Firm* — Brian Beverly; Beeson Skinner Beverly, LLP

(57) ABSTRACT

A method of manufacturing a velvet plush article includes the steps of: weaving a greige cloth by interweaving face yarns and backing yarns, wherein the face yarns are selected from single-ply bright trilobal yarns and two-ply yarns and the backing yarns are selected from FDY or DTY yarn: pre-processing the greige cloth by brushing, first setting, singeing and second setting the greige cloth sequentially; dyeing and/or printing the greige cloth; and finishing the greige cloth by softening, drying, brushing, sentering, heat-setting, singeing, shearing and final heat-setting the greige cloth. Accordingly, a velvet plush article having a superior smoothness and softness for providing a superior touch and feel comfort is achieved. The velvet plush article may be a velvet plush throw or blanket, or a velvet plush cloth for further processing.

20 Claims, 5 Drawing Sheets

(AMENDED)

(56) References Cited

U.S. PATENT DOCUMENTS 2,277,609 A * 3/1942 Rudisill ..... D02J 3/16 28/174
2,706,845 A * 4/1955 Delmar ..... 26/1
2,794,750 A * 6/1957 Ness ..... D04H 1/66 427/173
2,971,359 A * 2/1961 Hubbard ..... D04B 23/08 66/84 R
3,090,097 A * 5/1963 Ruckstuhl ..... D04B 21/02 28/162
3,186,057 A * 6/1965 Hadley ..... D06C 13/04 26/7
3,322,606 A * 5/1967 Koller ..... 428/95
3,403,433 A * 10/1968 Schoeneberg ..... D06M 11/38 26/19
3,419,936 A * 1/1969 Sims ..... 425/461
3,865,678 A * 2/1975 Okamoto et al. ..... 428/91
3,877,118 A * 4/1975 Misenheimer ..... D06C 29/00 26/2 R
3,999,940 A * 12/1976 Freeman ..... 8/449
4,388,750 A * 6/1983 Engels ..... D06C 3/06 15/308
4,449,276 A * 5/1984 Engels ..... D06C 23/02 139/391
4,475,417 A * 10/1984 Dornier ..... D06C 9/02 26/3
4,512,065 A * 4/1985 Otto ..... D03D 27/00 139/391
4,589,884 A * 5/1986 Gilpatrick ..... 8/481
5,407,448 A * 4/1995 Brandt ..... D06B 1/12 401/176
5,685,223 A * 11/1997 Vermuelen et al. ..... 101/129
5,737,813 A * 4/1998 Sternlieb ..... B29C 59/02 28/163
6,196,032 B1 * 3/2001 Rock ..... D04B 21/02 442/304
6,199,410 B1 * 3/2001 Rock ..... D04B 21/02 442/304
6,521,000 B1 * 2/2003 McFarland ..... D06B 11/0096 8/149.1
6,823,900 B2 * 11/2004 Wildeman ..... D06C 23/02 139/391
6,832,497 B1 * 12/2004 Rock ..... D04B 21/04 66/195
7,194,789 B2 * 3/2007 Thomaschefsky ..... D06C 11/00 26/28
7,213,309 B2 * 5/2007 Wang ..... B32B 5/02 26/28
7,428,772 B2 * 9/2008 Rock ..... 28/159
7,603,755 B2 * 10/2009 Gordon ..... D06C 11/00 26/28
9,732,455 B2 * 8/2017 Goenka ..... D06C 9/02
2002/0044188 A1 * 4/2002 Codos ..... B41J 2/01 347/106
2003/0172505 A1 * 9/2003 Kim ..... 28/159
2005/0246842 A1 * 11/2005 Jen ..... 8/115.51
2007/0124874 A1 * 6/2007 Jin et al. ..... 8/534
2007/0275207 A1 * 11/2007 Higgins ..... B32B 5/16 428/95
2010/0279114 A1 * 11/2010 Tobisawa ..... B29B 15/122 428/378
2011/0287210 A1 * 11/2011 Tung ..... 428/85
2012/0255643 A1 * 10/2012 Duan ..... 139/396
2012/0260422 A1 * 10/2012 Rock et al. ..... 5/483
2015/0159320 A1 * 6/2015 Lau ..... D06N 3/0006 442/59

FOREIGN PATENT DOCUMENTS

GB 190422098 * 9/1905
GB 543603 * 3/1942 ..... B44C 1/00

OTHER PUBLICATIONS

English Machine Translation of claims of CN102505535A from European Patent Office.*
English Abstract for CN102828375.*

* cited by examiner

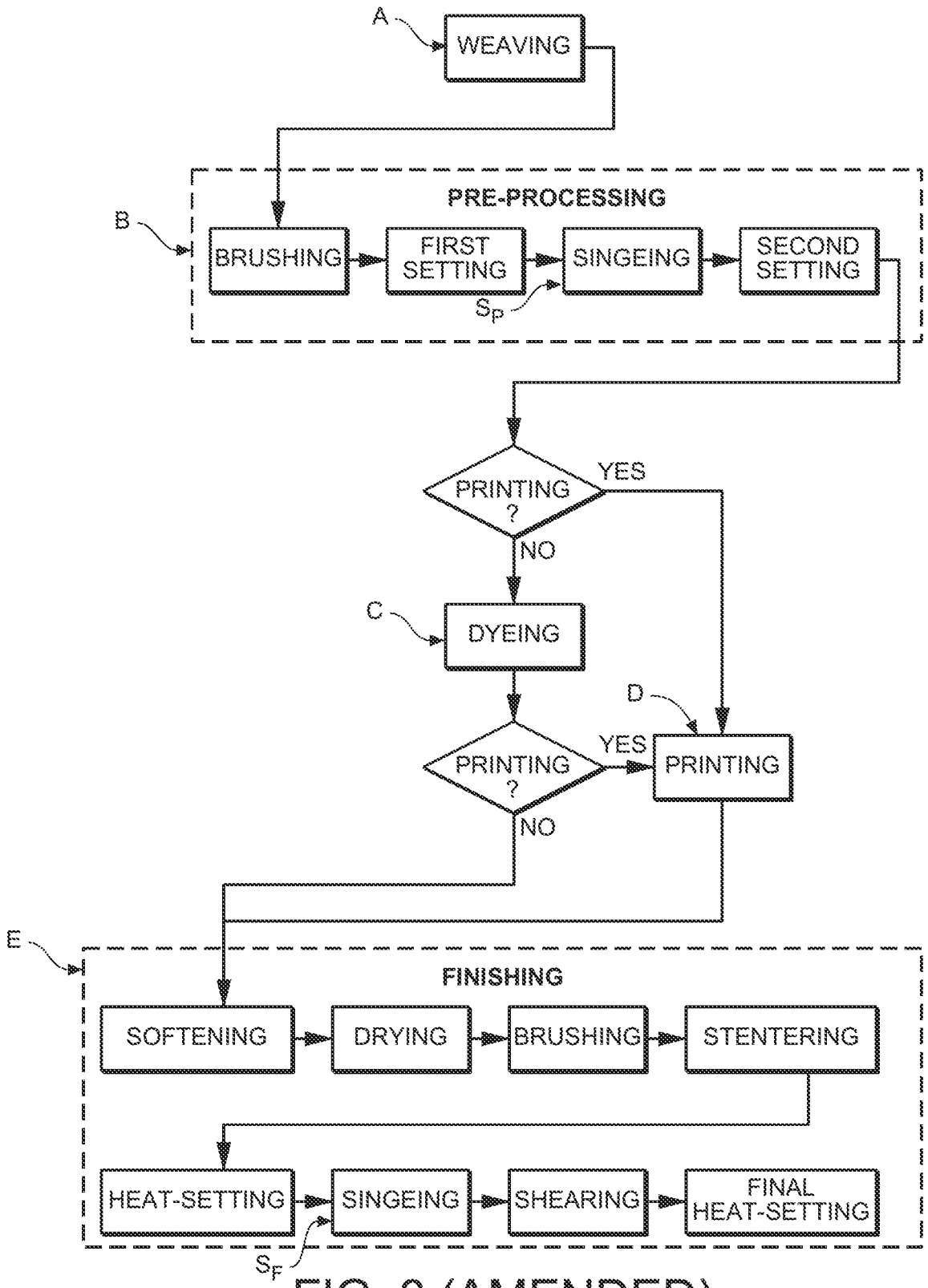
FIG. 3 (AMENDED)

FIG. 3A (NEW)
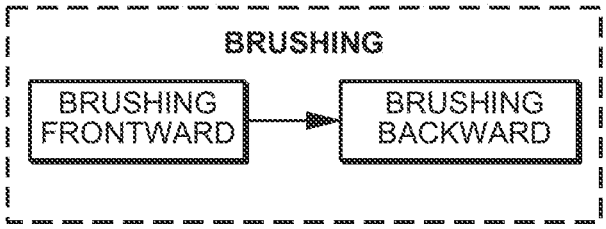
FIG. 3B (NEW)
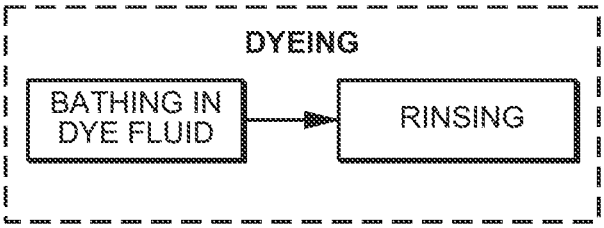
FIG. 3C (NEW)
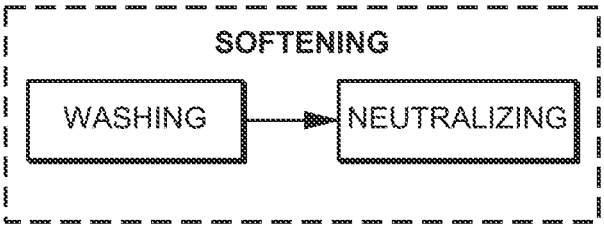
FIG. 3D (NEW)
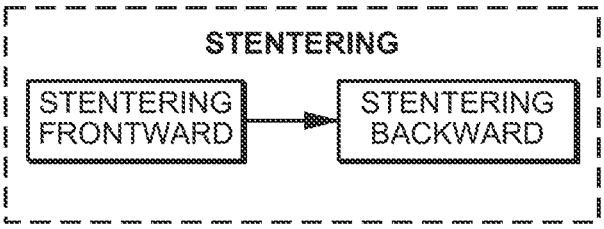
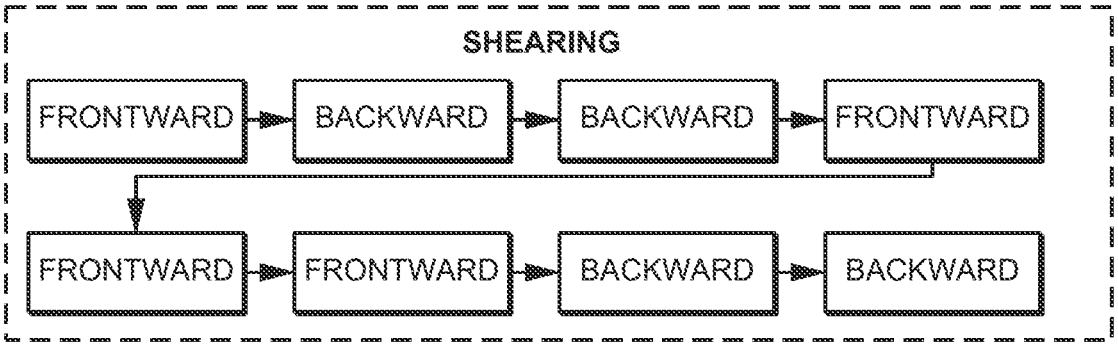
FIG. 3E (NEW)

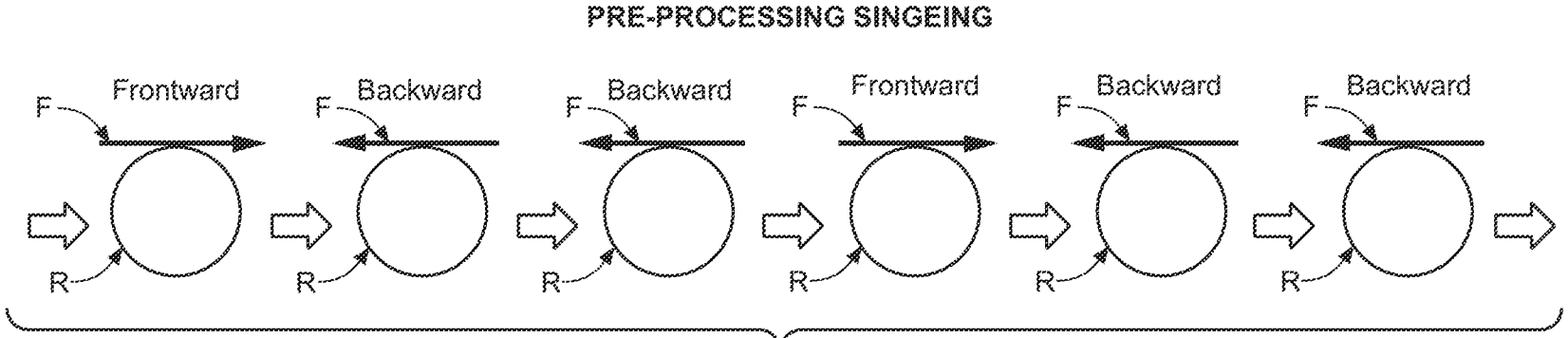
FIG. 4 (NEW)
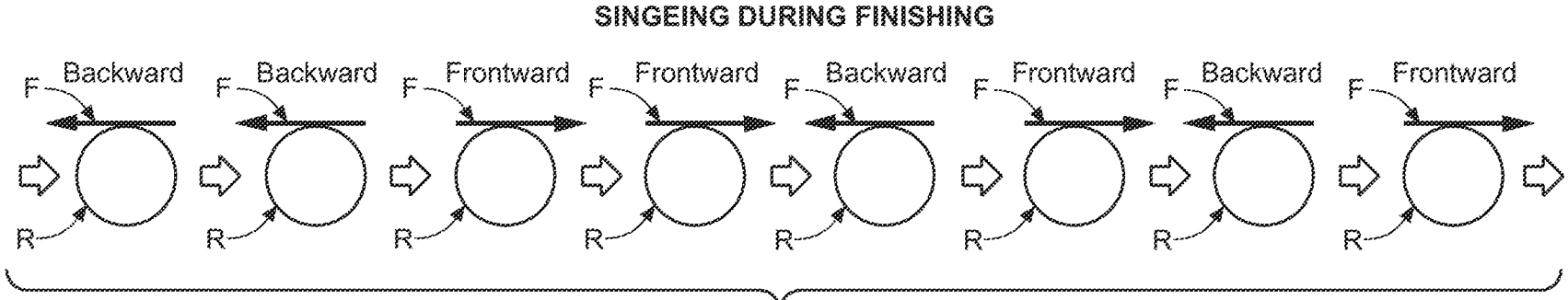
FIG. 5 (NEW)

METHOD OF MANUFACTURING VELVET PLUSH AND ARTICLE THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE PRESENT INVENTION

[1.] Field of Invention

The present invention relates to velvet plush, and more particularly to a method of manufacturing [velvet plush throw which utilizes synthetic fiber] *using synthetic fibers* to produce a [particularly] soft and smooth velvet plush [throw] *article*.

[2.] Description of Related Arts

Velvet plush has a generally soft and smooth texture and is a very popular material used in textiles. Velvet plush throws, blankets, and similar plush textiles are in popular use because they are very smooth and soft. However, the cost to manufacture a velvet plush throw, blanket or the like is very high. Conversely, efforts to manufacture velvet plush throws and blankets at more reasonable cost have resulted in lower quality articles. Materials such as silk[, cashmere, mohair, linen and cotton] are traditionally used for manufacturing velvet plush. Velvet plush articles produced from silk are especially soft and smooth. Silk, however, is a very expense raw material and is, therefore, less desirable when seeking to contain manufacturing costs. On the other hand, synthetic materials such as polyester and nylon are more reasonable in price, but the quality of a velvet plush cloth made with polyester or nylon is relatively low.

The conventional method for manufacturing a tufted surface involved needling and adding the tufted pile onto a backing, but this technique does not produce a smooth and soft tufted surface of high quality having an evenly distributed pile layer.

There is, thus, no practical cost-effective method in the prior art for the manufacture of a high quality velvet plush [throw] *article*.

SUMMARY OF THE PRESENT INVENTION

A method of manufacturing a velvet plush article according to the present invention comprises the steps of[:] *brushing a greige cloth comprising synthetic materials, and singeing the brushed greige cloth by passing it across a plurality of hot singe rollers. Brushing and singeing the greige cloth forms a pre-processed greige cloth including synthetic materials that is then suitable for finishing to form a velvet plush article.*

*In one embodiment of the invention a method of manufacturing a velvet plush article from a greige cloth comprising synthetic materials comprises the steps of:*

(A) weaving a greige cloth by interweaving face yarns and backing yarns, wherein the face yarns are selected from a group consisting of single-ply bright trilobal yarns having linear mass densities of 75D/144F, 90D/144F, 100D/144F or 150D/288F and two-ply yarns having linear mass densities of 120D/288F or 300D/574F, wherein the backing yarns are selected from fully drawn yarns having weights of [approximately] 68D-100D or draw textured yarns having weights of [approximately] 100D-150D;

(B) pre-processing the greige cloth by brushing, first setting, singeing and second setting the greige cloth sequentially;

(C) dyeing the preprocessed greige cloth to form a colored greige cloth; and (E) finishing by softening, drying, brushing, stentering, heat-setting, singeing, shearing and final heat-setting the colored greige cloth.

Alternately, after step (B) or (C), the method of manufacturing a velvet plush article further comprises the steps of:

(D) printing the pre-processed greige cloth obtained from step (B) or printing the colored greige cloth obtained from step (C) to form a printed and colored greige cloth; and (E) finishing by softening, drying, brushing, stentering, heat-setting, singeing, shearing and final heat-setting the colored or printed greige cloth sequentially.

[First and a second filaments] *Face yarns and backing yarns* are provided in step (A) in a ratio of 4:1, respectively.

The brushing in step (B) involves brushing in a frontward direction and in a backward direction; the first setting involves heat-setting at 120-130° C. at a rolling speed of 25 m/min; the singeing involves [a sequential rolling for six times at a frontward, backward, backward, frontward, backward and backward directions] *passing the greige cloth sequentially in frontward, backward, backward, frontward, backward and backward directions across heated cylinders*; the second setting involves heat-setting at 170-180° C. at a rolling speed of 25 m/min.

In step (C), dyeing the greige cloth includes bathing in [dye] *dyeing* fluid and rinsing in water. In one embodiment of the invention, the greige cloth is dyed for an additional twenty minutes and rinsed in water having a neutral or nearly neutral pH in order to produce a smooth and bright surface.

In step (D), printing includes the steps of brushing in a frontward direction, setting at 150° C. at a rolling speed of 25 m/min, and printing a preset pattern.

In step (E), softening includes washing to add acidity until the greige cloth is soft and then neutralizing the greige cloth until a pH of the greige cloth is neutral. If the pH is lower than 7, the fiber density of the greige cloth will diminish. If the pH is higher than 7, the greige cloth will be overly hardened; drying includes drying under 190° C. at a rolling speed of 20 m/min with an upper drying channel operated at 300 rpm and a lower drying channel operated at 1200 rpm; brushing includes two brushing cycles; stentering includes stentering at a frontward direction and a backward direction; heat-setting includes heat-setting under 150° C. at a rolling speed of 25 m/min with soft air; singeing includes [singe rolling] *passing the greige cloth across hot rollers* in frontward and backward directions, and [preferably] *in one embodiment* includes [singe rolling] *passing the greige cloth across hot rollers R* in backward, backward, frontward, frontward, backward, frontward, backward and frontward directions sequentially; shearing includes shearing at a frontward, backward, backward, frontward, frontward, frontward, backward and backward directions sequentially such that the final orientation of the pile hair is the same when approaching the cloth in both frontward and backward directions; and final heat-setting includes heat-setting at 190° C. at a rolling speed of 30 m/min.

In accordance with another aspect of the invention, the present invention comprises a velvet plush article, comprising:

a flat body having a middle layer defining a top surface and a bottom surface, and at least one pile layer extended from the middle layer on one of the top surface and the bottom surface, wherein the velvet plush article is made [in] *of* synthetic materials such as polyester and the pile layer provides a highly smooth and soft touch and feel.

In one embodiment, a color and/or a pattern is provided to the flat body of the velvet plush article. The velvet plush article manufactured according to the method can also be a velvet plush blanket or simply a velvet plush sheet which can be further processed.

The method described above advantageously uses synthetic materials to product a high quality velvet plush article having superior smoothness and a soft hand, employs an automated process which lowers costs and improves quality, and flexibly allows the article to optionally be dyed and printed.

BRIEF DESCRIPTION OF THE DRAWINGS

FIG. 3 is a high-level flowchart of a method of manufacturing [velvet] *a velvet* plush article according to the invention.

*FIGS. 3A-3E are flowcharts showing the processes of brushing, dyeing, softening, stentering and shearing in alternate embodiments of the invention.*

*FIG. 4 is a representative schematic showing singeing during the pre-processing step.*

*FIG. 5 is a representative schematic showing singeing during the finishing step.*

DETAILED DESCRIPTION OF THE PREFERRED EMBODIMENT

Figure 1:
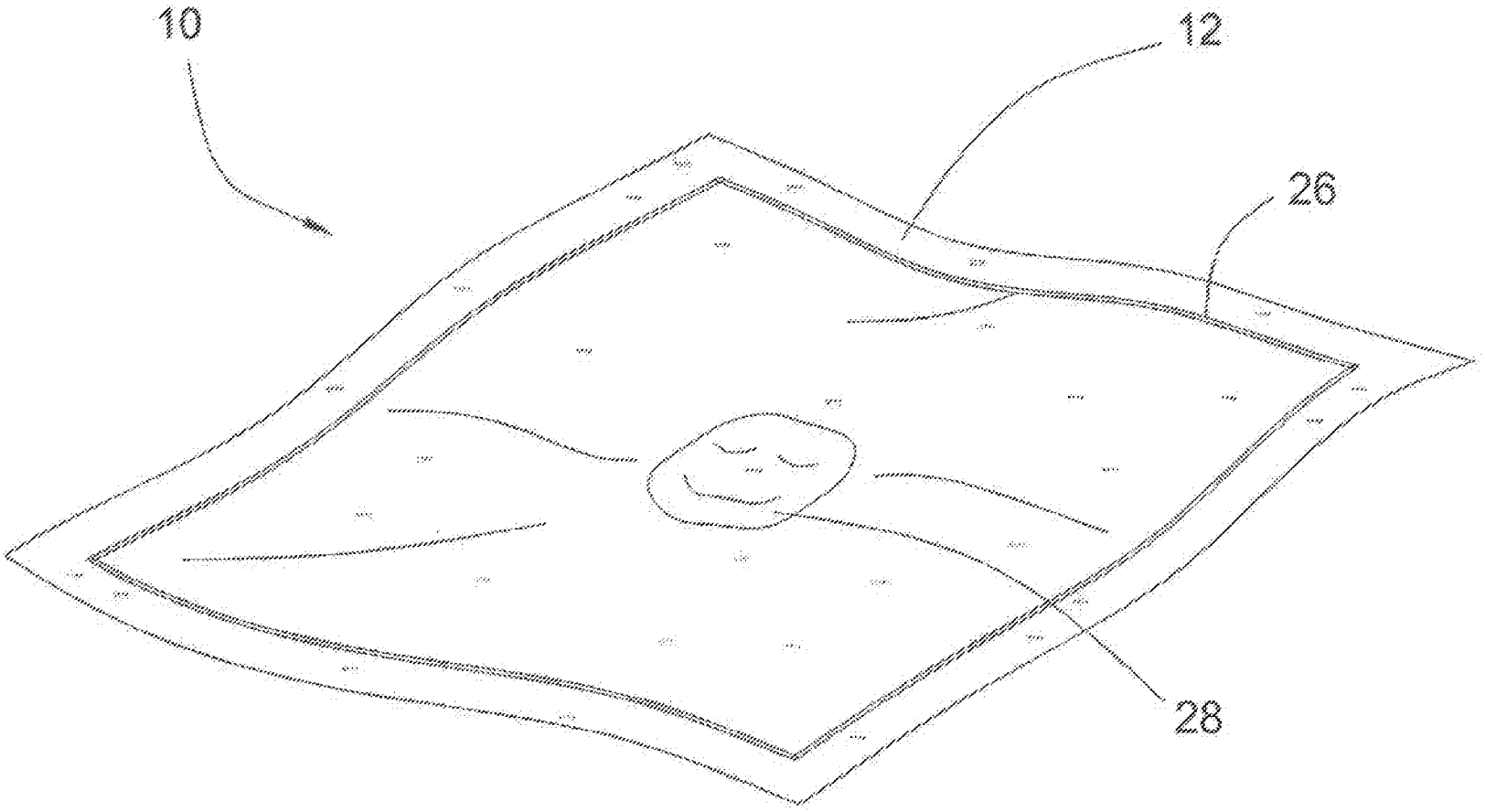
FIG. 1 is an upper perspective view of a velvet plush article according to the invention.
Figure 2:
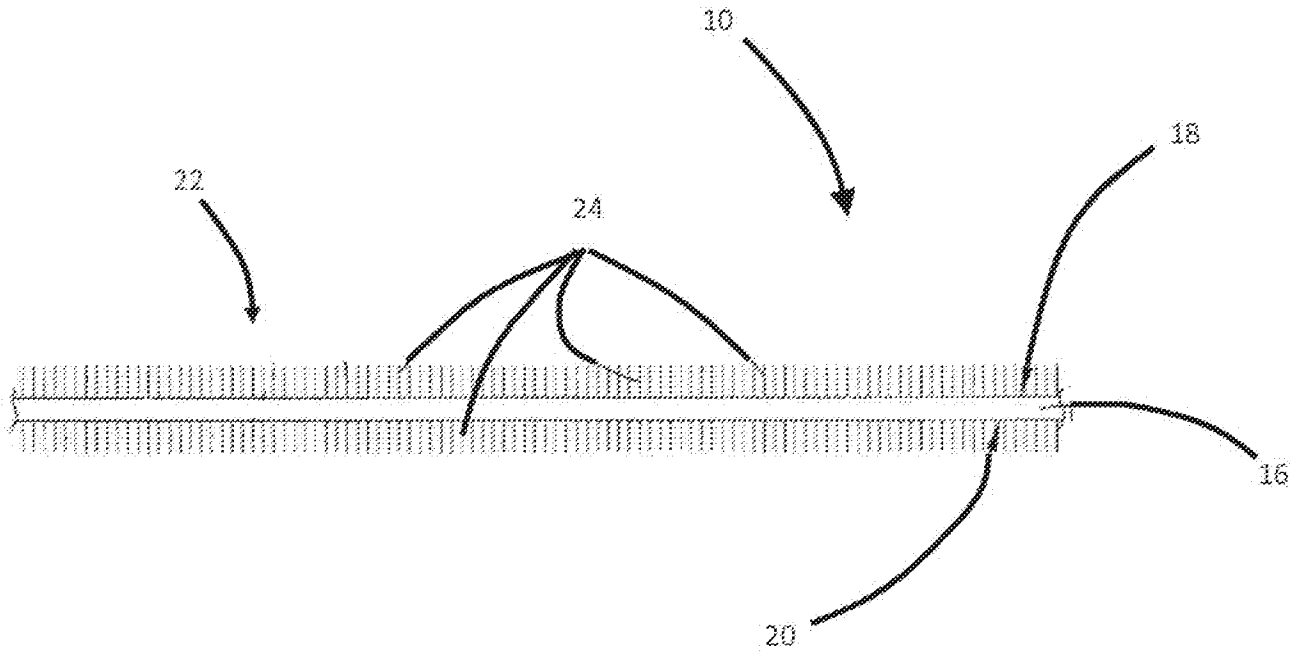
FIG. 2 is an end view thereof.

Referring to FIGS. 1-3 of the drawings, a method of manufacturing velvet plush article and a final velvet plush article are described below. [The] *With particular reference to FIG. 3, a* method of manufacturing a velvet plush article comprises the steps of:

(A) weaving a greige cloth, *at A*;

(B) pre-processing the greige cloth from step (A), *at B*;

(C) dyeing the greige cloth after step (B), *at C*;

(D) printing the greige cloth after step (B) or (C), *at C*; and (E) finishing the greige cloth to form a final velvet plush article, *at E*.

The dyeing and printing steps are optional and may be performed as desired in order to provide the velvet plush article with a particular color and pattern.

As shown in FIG. 2, the velvet plush article 10 has a flat body 12 having a middle layer 16 defining a top surface 18 and a bottom surface 20, and [at least one] *a* pile layer 22 comprising a plurality of pile hairs 24 extending from the middle layer 16 on the top surface 18, the bottom surface 20, or both. The velvet plush article *in the illustrated embodiment* 10 has [two] pile layers 22 on *each of* the top surface 18 and the bottom surface 20 [respectively] and the pile hair 24 is uni-directional [in which a direction of the pile hair 24 at a frontward direction is the same as a direction of the pile hair at a backward direction] *in that the direction of the pile hair 24 from a frontward direction is the same as the direction of the pile hair from a backward direction.* [The] *According to the invention, the* velvet plush article 10 [is made of] *comprises* synthetic materials such as polyester and the two pile layers 22 on the top surface 18 and the bottom surface 20 provide a highly smooth and soft touch and feel to a user. In addition, a color 14 and/or a pattern 16 can be provided on one or both of the two pile layers 22 on the top surface 18 and/or the bottom surface 20 as seen in FIG. 1. The velvet plush article 10 can also be manufactured as a velvet plush blanket or a velvet plush sheet for further processing.

[As shown in] *With reference again to* FIG. 3, the method of manufacturing a velvet plush article comprises the steps of:

(A) weaving a greige cloth by interweaving face yarns and backing yarns, wherein the face yarns are selected from a group consisting of single-ply bright trilobal yarns having linear mass densities of 75D/144F, 90D/144F, 100D/144F or 150D/288F and two-ply yarns having linear mass densities of 120D/288F or 300D/574F, wherein the backing yarns are selected from fully drawn yarns having weights of [approximately] 68D-100D or draw textured yarns having weights of [approximately] 100D-150D;

(B) pre-processing the greige cloth-obtained from step (A) by brushing, first setting, singeing and second setting the greige cloth sequentially;

(C) dyeing the preprocessed greige cloth to form a colored greige cloth; and (E) finishing by [sequentially] softening, drying, brushing, stentering, heat-setting, singeing, shearing and final heat-setting the colored greige cloth.

Alternately, after the step (B) or (C), the method of manufacturing a velvet plush article further comprises the steps of:

(D) printing the pre-processed greige cloth obtained from step (B) or printing the pre-processed and colored greige cloth obtained from step (C) to form a printed greige cloth; and (E) finishing by softening, drying, brushing, stentering, heat-setting, singeing, shearing and final heat-setting the colored or printed greige cloth [sequentially].

[Preferably] *In one embodiment of the invention*, in step (A), [first and second filaments] *the face yarns and backing yarns* are provided in a ratio of 4:1[, wherein the first filament is a backing filament].

In step (B), *in one embodiment of the invention* the brushing involves brushing in a frontward direction and in a backward direction *as shown in FIG. 3A*; the first setting involves heat-setting at 120-130° C. at a rolling speed of 25 m/min; *as shown in FIG. 4,* the singeing involves [a sequential rolling for six times at a frontward, backward, backward, frontward, backward and backward directions] *singe rolling performed by passing the greige cloth F in frontward, backward, backward, frontward, backward and backward directions sequentially across hot rollers R*; and the second setting involves heat-setting at 170-180° C. at a rolling speed of 25 m/min.

In step (C), dyeing the greige cloth includes bathing in dye fluid and rinsing with water *as shown in FIG. 3B*. In one embodiment additional dyeing time of 20 minutes is required due to immersion of the greige cloth in a water bath having a neutral pH or the lowest acidity that will result in a smooth and bright surface.

in step (D), printing includes the steps of brushing in a frontward direction, setting at 150° C. at a rolling speed of 25 m/min, and printing a preset pattern.

In step (E), softening includes washing to add acidity until the greige cloth is soft and then neutralizing the pH of the greige cloth *as shown in FIG. 3C*. If the pH is lower than 7, the fiber density of the greige cloth will diminish. If the pH is greater than 7, the greige cloth will be hardened; drying includes drying under 190° C. at a rolling speed of 20 m/min with an upper drying channel operated at 300 rpm and a lower drying channel operated at 1200 rpm; brushing includes brushing two brushing cycles; stentering includes stentering in a frontward direction and a backward direction *as shown in FIG. 3D*; heat-setting includes heat-setting under 150° C. at a rolling speed of 25 m/min with soft air; singeing includes passing the greige cloth across *a plurality of* hot [singe] rollers in frontward and backward directions, and preferably, *as shown in FIG. 5,* includes passing the greige cloth *F* across hot [singe] rollers *R* in backward, backward, frontward, frontward, backward, frontward, backward and frontward directions sequentially; shearing includes shearing in frontward, backward, backward, frontward, frontward, frontward, backward and backward directions sequentially, *as shown in FIG. 3E,* such that the final orientation of the pile hair is the same when approaching the cloth in both frontward and backward directions; and final heat-setting includes heat-setting at 190° C. at a rolling speed of 30 m/min.

There have thus been described and illustrated certain embodiments of a method of manufacturing velvet plush according to the invention. Although the present invention has been described and illustrated in detail, it should be clearly understood that the disclosure is illustrated only and is not to be taken as limiting, the spirit and scope of the invention being limited only by the terms of the appended claims and their legal equivalents.

What is claimed is:

1. A method of manufacturing a velvet plush article, comprising the steps of:

weaving a greige cloth by interweaving face yarns and backing yarns, said face yarns comprising single-ply trilobal yarns or two-ply yarns and said backing yarns comprising fully drawn yarns or draw-textured yarns;

pre-processing by sequentially brushing, first setting, singeing and second setting said greige cloth;

dyeing the pre-processed greige cloth to form a colored cloth; and finishing by sequentially softening, drying, brushing, stentering, *first* heat-setting, singeing, shearing and final heat-setting said colored greige cloth to form a finished velvet plush article having a flat body including a middle layer and two pile layers, each said pile layer having pile hair that is uni-directional, smooth and soft.

2. The method of claim 1 further comprising the steps of:

printing a pattern on said colored cloth, and performing said finishing step on the printed colored cloth.

3. The method of claim 1 wherein said single-ply trilobal yarns are selected from the group of yarns having linear mass densities of 75D/144F, 90D/144F, 100D/144F and 150D/288F, the two-ply yarns are selected from the group of yarns having linear mass densities of 120D/288F or 300D/574F, and the backing yarns are yarns selected from fully drawn yarns having a weight of [approximately] 68D-100D or draw textured yarns having a weight of [approximately], 100D-150D.

4. The method of claim 2 wherein said single-ply trilobal yarns are selected from the group of yarns having linear mass densities of 75D/144F, 90D/144F, [120D/288F and 300D/574F] *100D/144F and 150D/288F*, and the backing yarns are yarns selected from fully drawn yarns having a weight of [approximately] 68D-100D or draw textured yarns having a weight of [approximately] 100D-150D.

5. The method of claim 3 wherein said face yarns and said backing yarns have a ratio of 4:1 by weight.

6. The method of claim 4 wherein said face yarns and said backing yarns have a ratio of 4:1 by weight.

7. The method of claim 5 wherein:

said brushing *during pre-processing* includes brushing in a frontward direction and brushing in a backward direction opposite of said frontward direction;

said first setting process includes heat-setting between [approximately] 120-130° C. at a rolling speed of 25 m/min;

said singeing process *during pre-processing* includes passing said greige cloth across hot singe rollers in frontward, backward, backward, frontward, backward and backward directions, sequentially; and said second setting process includes heat-setting between [approximately] 170-180° C. at a rolling speed of 25 m/min.

8. The method of claim 6 wherein:

said brushing *during pre-processing* includes brushing in a frontward direction and brushing in a backward direction opposite of said frontward direction;

said first setting process includes heat-setting between [approximately] 120-130° C. at a rolling speed of 25 m/min;

said singeing process *during pre-processing* includes passing said greige cloth across hot singe rollers in frontward, backward, backward, frontward, backward and backward directions, sequentially; and said second setting process includes heat-setting between [approximately] 170-180° C. at a rolling speed of 25 m/min.

9. The method of claim 7 wherein said dyeing comprises the substeps of:

bathing in dye fluid, and rinsing with water having a neutral pH or a low acidity that will result in the dyed greige cloth having a smooth and bright surface.

10. The method of claim 8 wherein said dyeing comprises the substeps of:

bathing in dye fluid, and rinsing with water having a neutral pH or a low acidity that will result in the dyed greige cloth having a smooth and bright surface.

11. The method of claim 10 wherein the softening process includes:

washing to add acidity until the greige cloth is soft, and neutralizing the pH of the acidified greige cloth;

the drying process includes drying at [approximately] 190° C. at a rolling speed of 20 m/min with an upper drying channel operated at 300 rpm and a lower drying channel operated at 1200 rpm;

the brushing process *during finishing* includes two brushing cycles;

the stentering process includes stentering in a frontward direction and in a backward direction[, sequentially];

the *first* heat-setting process includes heat-setting at [approximately] *under* 150° C. at a rolling speed of 25 m/min;

the singeing process *during finishing* includes passing said greige cloth across hot singeing rollers in backward, backward, frontward, frontward, backward, frontward, backward and frontward directions, sequentially;

the shearing process includes shearing in frontward, backward, backward, frontward, frontward, frontward, backward and backward directions, sequentially, such that the final orientation of the pile hair is the same when approaching the cloth from both frontward and backward directions; and the final heat-setting process includes heat-setting at [approximately] 190° C. at a rolling speed of 30 m/min.

12. The method of claim 9 wherein the softening process includes:

washing to add acidity until the greige cloth is soft, and neutralizing the pH of the acidified greige cloth;

the drying process includes drying at [approximately] 190° C. at a rolling speed of 20 m/min with an upper drying channel operated at 300 rpm and a lower drying channel operated at 1200 rpm;

the brushing process *during finishing* includes two brushing cycles;

the stentering process includes stentering in a frontward direction and in a backward direction, sequentially;

the heat-setting process includes heat-setting at [approximately] *under* 150° C. at a rolling speed of 25 m/min;

the singeing process *during finishing* includes passing said greige cloth across hot singeing rollers in backward, backward, frontward, frontward, backward, frontward, backward and frontward directions, sequentially;

the shearing process includes shearing in frontward, backward, backward, frontward, frontward, frontward, backward and backward directions, sequentially, such that the final orientation of the pile hair is the same when approaching the cloth in both frontward and backward directions; and the final heat-setting process includes heat-setting at [approximately] 190° C. at a rolling speed of 30 m/min.

13. A method of manufacturing a velvet plush article, comprising the steps of:

weaving a greige cloth by interweaving face yarns and backing yarns, said face yarns comprising single-ply trilobal yarns or two-ply yarns and said backing yarns comprising fully drawn yarns or draw-textured yarns;

pre-processing by sequentially brushing, first setting, singeing and second setting said greige cloth;

dyeing the pre-processed greige cloth to form a colored cloth; and finishing by sequentially softening, drying, brushing, *first* heat-setting, singeing, shearing and final heat-setting said colored greige cloth to form a finished velvet plush article having pile hair that is uni-directional, smooth and soft.

14. The method of claim 13 further comprising the process of stentering between said brushing and said heat-setting processes in said finishing step, said velvet plush article having a flat body including a middle layer and two pile layers, each pile layer having pile hair that is uni-directional, smooth and soft.

15. The method of claim 13 further comprising the step of printing on said colored cloth.

16. The method of claim 13 wherein said single-ply trilobal yarns are selected from the group of yarns having linear mass densities of 75D/144F, 90D/144F, [120D/288F and 300D/574F] *100D/144F and 150D/288F*, and said backing yarns are yarns selected from fully drawn yarns having a weight of [approximately] 68D-100D or draw textured yarns having a weight of [approximately] 100D-150D.

17. The method of claim 13 wherein said face yarns and said backing yarns have a ratio of 4:1 by weight.

18. The method of claim 13 wherein said brushing process *during pre-processing* includes brushing in a frontward direction and brushing in a backward direction;

said first setting process includes heat-setting between [approximately] 120-130° C. at a rolling speed of 25 m/min;

said singeing process *during pre-processing* includes passing the greige cloth across hot singe rollers in frontward, backward, backward, frontward, backward and backward directions, sequentially; and said second setting process includes heat-setting between [approximately] 170-180° C. at a rolling speed of 25 m/min.

19. The method of claim 13 wherein said dyeing step comprises the substeps of:

bathing said pre-processed greige cloth in a dye [solution] *fluid*, and neutralizing the pH *or lowering the* acidity of said greige cloth to give the dyed greige cloth a smooth and bright surface.

20. The method of claim 13 wherein the softening process includes:

washing to add acidity until the greige cloth is soft, and neutralizing the pH of the acidified greige cloth;

the drying process includes drying at [approximately] 190° C. at a rolling speed of 20 m/min with an upper drying channel operated at 300 rpm and a lower drying channel operated at 1200 rpm;

the *first* heat-setting process includes heat-setting at [approximately] *under* 150° C. at a rolling speed of 25 m/min;

the singeing process *during finishing* includes passing said greige cloth across hot singeing rollers in backward, backward, frontward, frontward, backward, frontward, backward and frontward directions, sequentially;

the shearing process includes shearing in frontward, backward, backward, frontward, frontward, frontward, backward and backward directions, sequentially, such that the final orientation of the pile hair is the same when approaching the cloth in both frontward and backward directions; and the final heat-setting process includes heat-setting at [approximately] 190° C. at a rolling speed of 30 m/min.

* * * * *